United States Patent [19]

Grossman et al.

[11] Patent Number: 4,458,500

[45] Date of Patent: Jul. 10, 1984

[54] ABSORPTION HEAT PUMP SYSTEM

[75] Inventors: Gershon Grossman, Oak Ridge; Horacio Perez-Blanco, Knoxville, both of Tenn.

[73] Assignee: The United States of America as represented by the United States Department of Energy, Washington, D.C.

[21] Appl. No.: 388,875

[22] Filed: Jun. 16, 1982

[51] Int. Cl.³ .................................................. F25B 15/00
[52] U.S. Cl. ................................... 62/238.3; 62/494; 62/497; 62/476; 165/104.12
[58] Field of Search ............... 165/104.16; 62/484, 62/494, 497, 238.3, 476

[56] References Cited

U.S. PATENT DOCUMENTS

| | | | |
|---|---|---|---|
| 4,246,762 | 1/1981 | Bourne | 62/238.3 |
| 4,307,577 | 12/1981 | Watanabe et al. | 62/238.3 |
| 4,337,625 | 7/1982 | Wilkinson | 62/238.3 |

OTHER PUBLICATIONS

G. Cohen et al., *A New Absorption-Cycle Process for Upgrading Waste Heat*, 14th Intersociety Energy Conversion Conf., Boston, Mass., 8/5–10/79, pp. 1720–1724.

D. Williams et al., *A Heat Pump Powered by Natural Thermal Gradients*, 9th Intersociety Energy Conversion Conf. (IECEC), 8/26–30/74, Paper #749,041, pp. 538–540.

*Primary Examiner*—Albert W. Davis, Jr.
*Attorney, Agent, or Firm*—Edwin D. Grant; Stephen D. Hamel

[57] ABSTRACT

An improvement in an absorption heat pump cycle is obtained by adding adiabatic absorption and desorption steps to the absorber and desorber of the system. The adiabatic processes make it possible to obtain the highest temperature in the absorber before any heat is removed from it and the lowest temperature in the desorber before heat is added to it, allowing for efficient utilization of the thermodynamic availability of the heat supply stream. The improved system can operate with a larger difference between high and low working fluid concentrations, less circulation losses, and more efficient heat exchange than a conventional system.

5 Claims, 8 Drawing Figures

ABSORPTION HEAT PUMP SYSTEM

BACKGROUND OF THE INVENTION

This invention, which resulted from a contract with the United States Department of Energy, relates to an absorption heat pump system for utilizing heat in a liquid to increase the temperature of a portion of the same liquid or the temperature of another liquid.

Very large quantities of waste heat at low temperatures are rejected daily from industrial plants throughout the world. Other sources of low-temperature heat are also available (e.g., geothermal and solar) with a total energy value equivalent to many millions of tons of fossil fuel. In order to make effective use of this heat, it is often necessary to boost its temperature typically by 10° C. to 60° C. Different heat pump cycles have been considered for doing this, the most common of which require electricity as a source of power. The absorption cycle is one of the more promising and has the advantage of using part of the waste heat to power itself, while boosting the temperature of the rest.

SUMMARY OF THE INVENTION

An object of this invention is to improve the efficiency of an absorption heat pump system for raising the temperature of a normally unusable source of heat energy, such as water at a temperature of about 140° F. (60° C.).

The above object is achieved by a preferred embodiment of the invention in which a gas-liquid contactor is included in either or both the absorber and desorber of an absorption heat pump system to add adiabatic process steps to the operations normally occurring therein. This innovation permits achievement of a higher increase in temperature of a liquid than possible heretofore and a higher coefficient of performance (COP).

DETAILED DESCRIPTION OF A PREFERRED EMBODIMENT OF THE INVENTION

Figure 1:
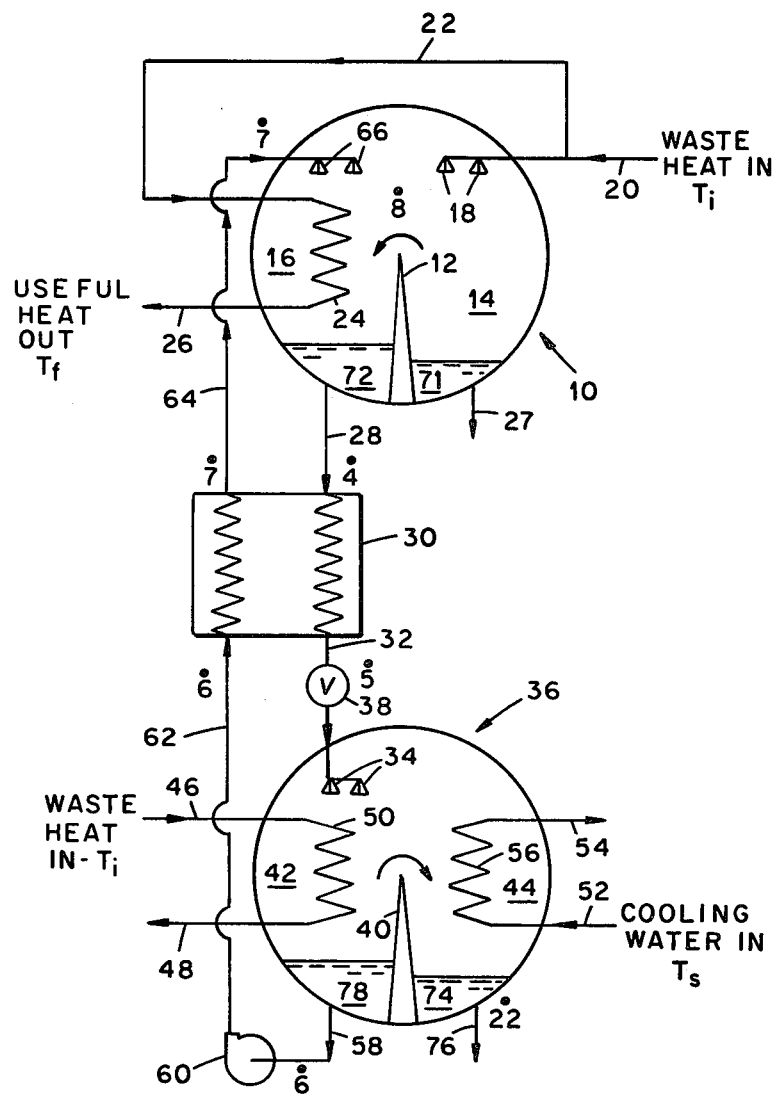
FIG. 1 is a schematic representation of a single stage absorption heat pump system in conventional form.
Figure 2:
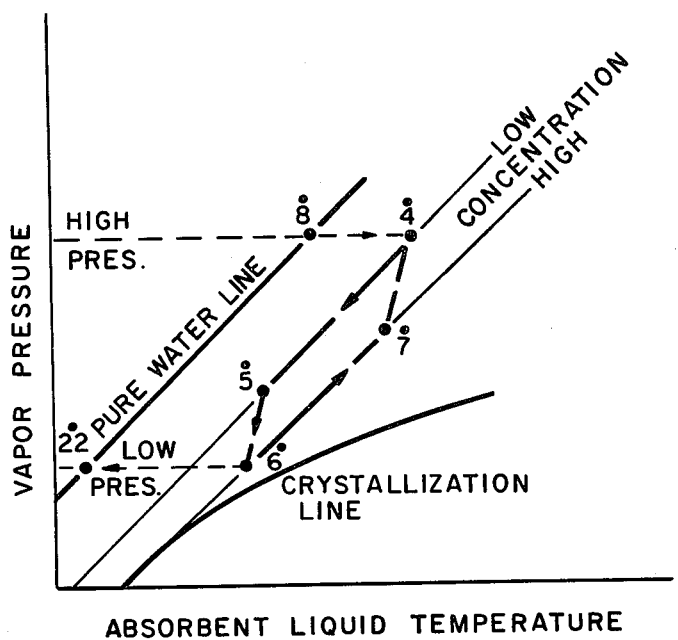
FIG. 2 is an equilibrium diagram for a common working fluid (namely, water and lithium bromide) employed in the apparatus illustrated in FIG. 1.

FIG. 1 illustrates an absorption heat pump system of one type known in the prior art. Reference number 10 generally designates a vessel provided with a barrier 12 that extends partially across its central portion and thus divides the space therein into two communicating sections, namely, a flash chamber (or evaporator) 14 and an absorber section 16. A liquid at a comparatively low temperature is discharged in the form of fine droplets into evaporator 14 from a suitable distributor means such as a plurality of spray nozzles 18 connected to the source of the liquid by a conduit 20. Another conduit 22 branches off from conduit 20 and connects with a heat exchanger 24 located in absorber 16, and a conduit 26 conducts liquid from the heat exchanger after its temperature has been boosted therein as will be further discussed hereinafter. Liquid which is not vaporized in the evaporator is removed therefrom through a conduit 27.

A conduit 28 communicates with the interior of vessel 10 at the lower portion of the absorber side thereof and extends to a heat exchanger 30, which is generally referred to in absorption heat pump systems as a recuperator. Liquid that enters recuperator 30 through conduit 28 passes through a conduit 32 to another distributor which may be comprised of a plurality of spray nozzles 34 and which is located in a second vessel generally designated by reference numeral 36. A valve 38 is provided to control flow through conduit 32.

A barrier 40 divides the interior of vessel 36 into two communicating sections, namely, a desorber 42 and a condenser 44. Inlet and outlet conduits 46,48 respectively conduct a low-temperature heating liquid into and out of a heat exchanger 50 positioned under distributor nozzles 34 in desorber 42, and inlet and outlet conduits 52,54 respectively conduct coolant into and out of a heat exchanger 56 in condenser 44. A conduit 58 communicates with the interior of vessel 36 at the lower portion of the desorber side thereof and extends to a pump 60, and conduit 62 extends from the pump to recuperator 30. Liquid that enters recuperator 30 through conduit 62 passes through a conduit 64 to a distributor which may consist of a plurality of spray nozzles 66, the latter being disposed above heat exchanger 24.

Figure 3:
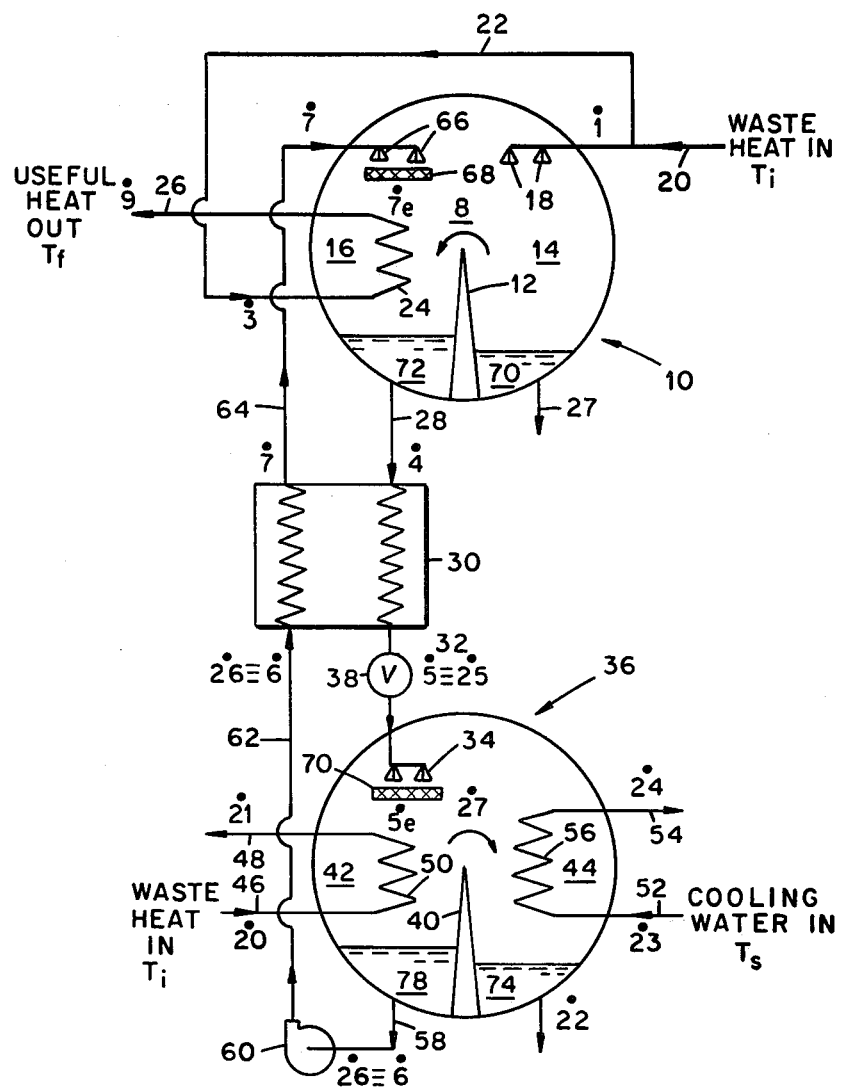
FIG. 3 is a schematic representation of a single stage heat pump system in which the subject invention is incorporated.

FIG. 3 illustrates an absorption heat pump system which includes the same components that have been identified in the above description (these components being designated by the same reference numbers used for corresponding components in FIG. 1) and which in addition includes (1) a first gas-liquid contactor 68 positioned between heat exchanger 24 and distributor nozzles 66 and (2) a second gas-liquid contactor 70 positioned between distributor nozzles 34 and heat exchanger 50. As will be described hereinafter, the gas-liquid contactors 68,70 may consist of different types of column packing materials or, as will be further described hereinafter, they may be tubes in heat exchangers 24,50 through which no liquid flows. It should be noted that in heat exchangers 24,50 of the apparatus illustrated in FIG. 1, the liquid passing through the heat exchangers and the liquid discharged from distribution nozzles 34,66 flow in the same direction, whereas in the apparatus illustrated in FIG. 3 the direction of flow of the same liquids in the same heat exchangers is in counterflow.

Figure 5:
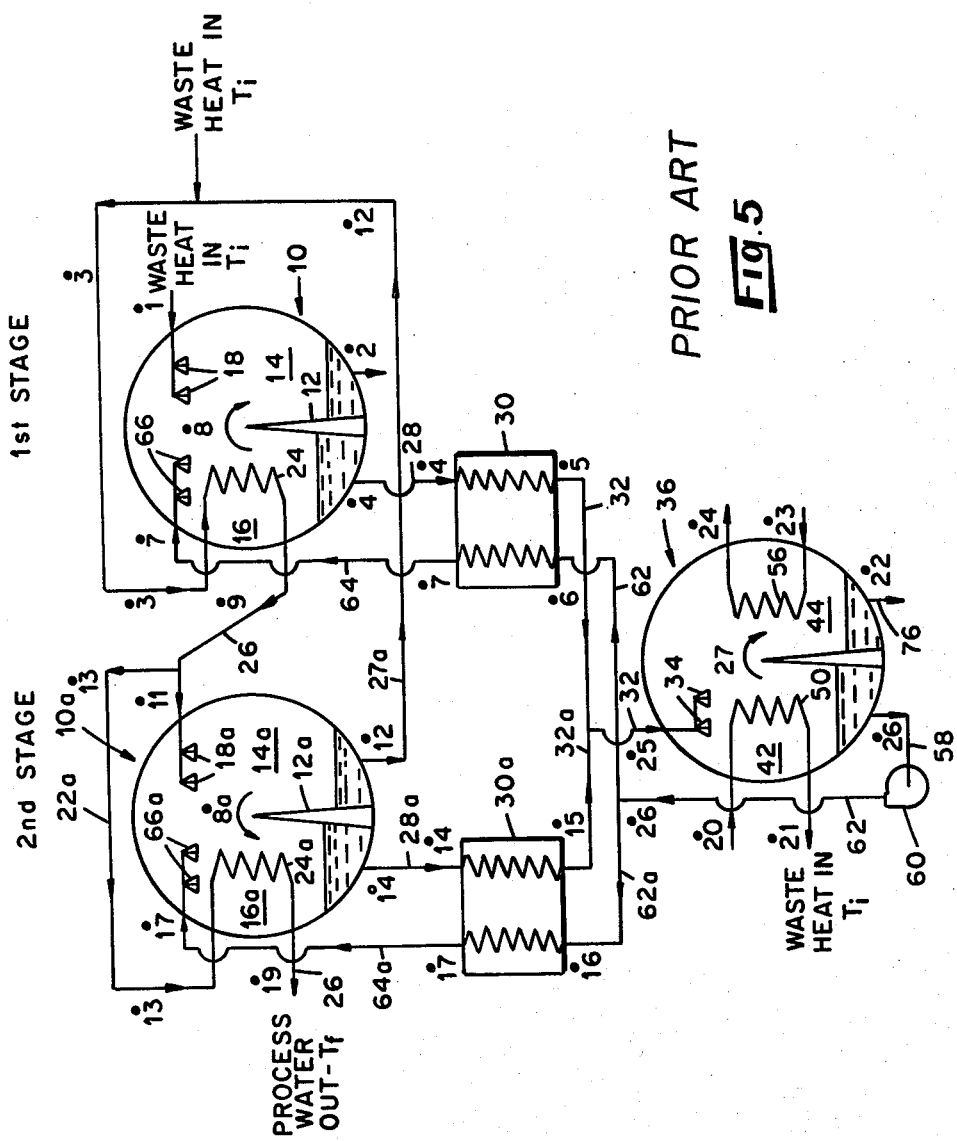
FIGS. 5 and 6 illustrate two-stage absorption heat pump systems in conventional form and with the improvement provided by the invention, respectively.

FIG. 5 illustrates a conventional two-stage absorption heat pump system comprising a first stage absorber/evaporator vessel 10 and a desorber/condenser vessel 36 having the same components therein as the vessels 10,36 which are illustrated in FIG. 1 and described hereinbefore. However, in the two-stage system, part of the liquid heated in heat exchanger 24 in vessel 10 is fed through conduit 26 to distributor nozzles 18a in a second stage absorber/evaporator vessel 10a and the remainder of the heated liquid is fed through a branch conduit 22a to the heat exchanger 24a of the absorber 16a of the second stage vessel. Liquid flows from absorber 16 of vessel 10 to nozzles 34 in desorber 42 of vessel 36 via conduit 28, recuperator 30, and conduit 32, and liquid flows from absorber 16a of vessel 10a to the same nozzles via conduit 28a, recuperator 30a, and conduit 32a which connects with conduit 32. As in the apparatus illustrated in FIG. 1, a conduit 58 communicates with the interior of vessel 36 at the lower portion of the desorber side thereof and extends to a pump 60, a conduit 62 extends from the pump to recuperator 30, and a conduit 64 extends from the recuperator to nozzles 66 in vessel 10. In addition, a branch conduit 62a is connected to conduit 62 and recuperator 30a, and a conduit 64a extends from the last-mentioned recuperator to nozzles 66a in vessel 10a. Lastly, a conduit 27a communicates with the interior of vessel 10a at the lower portion of the absorber side thereof and extends to heat exchanger 24 in vessel 10.

Figure 6:
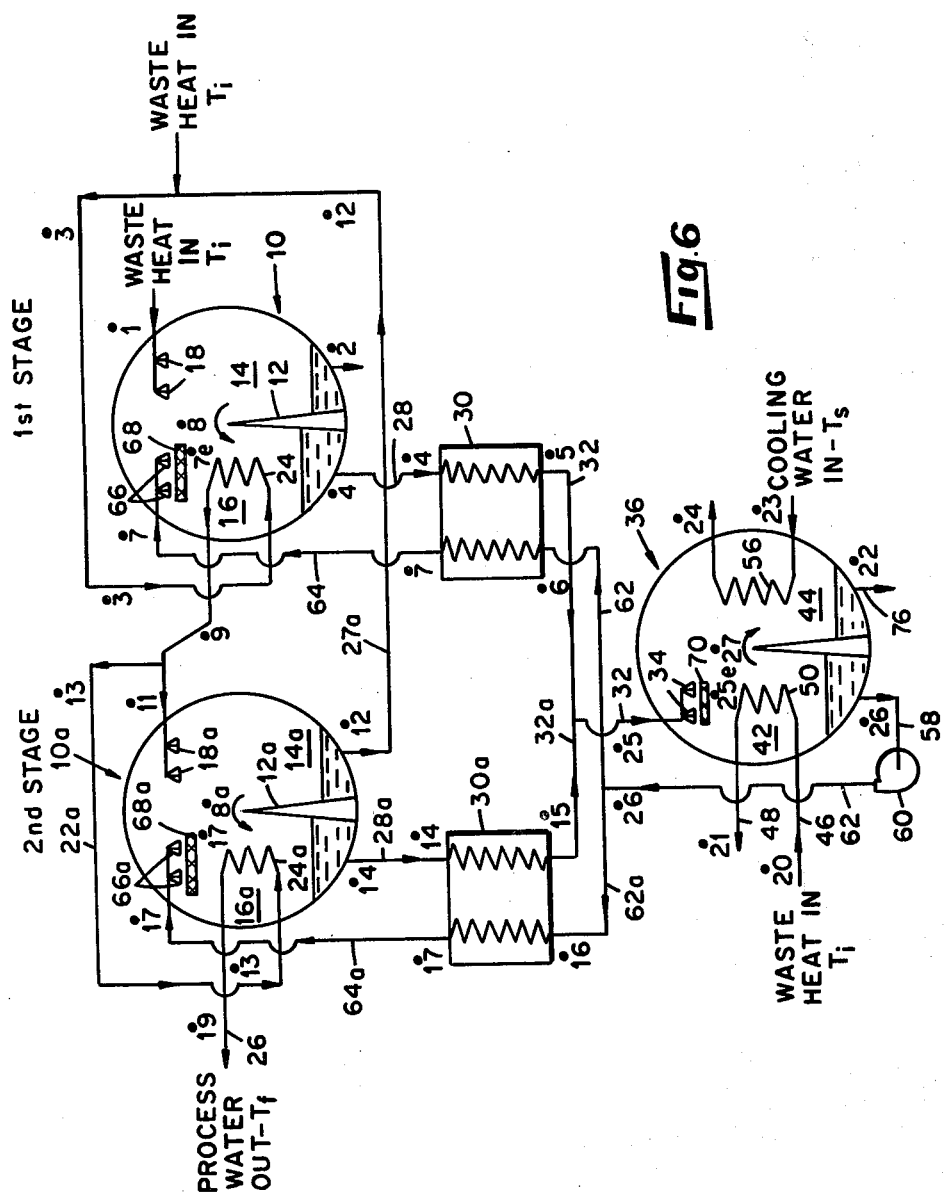

The embodiment of the invention illustrated in FIG. 6 has the same construction as the two-stage absorption heat pump system which has just been described with the exception that it includes gas-liquid contactors of the type shown in FIG. 3. More particularly, in the apparatus illustrated in FIG. 6, gas-liquid contactors 68,68a are respectively positioned between nozzles 66,66a and heat exchangers 24,24a of absorber sections 16,16a in vessels 10,10a, and a gas-liquid contactor 70 is also positioned between nozzles 34 and heat exchanger 50 of desorber 42 in vessel 36.

OPERATION OF PREFERRED EMBODIMENTS OF THE INVENTION

Because of their common use in absorption heat pump systems, water will be assumed to be the liquid that is vaporized in the evaporators of the described heat pump systems, and a solution of lithium bromide and water will be assumed to be the liquid that absorbs water vapor in their absorbers. In the conventional absorption heat pump system illustrated in FIG. 1, the lithium bromide/water absorbent solution is discharged in the form of droplets from nozzles 66 and absorbs the water vapor which is generated in evaporator 14 and which flows into absorber 16 as indicated by the arrow above barrier 12. The heat generated by absorption of water into the absorbent solution is transferred at heat exchanger 24 to the stream of water entering the heat exchanger through conduit 22.

Water which is discharged from nozzles 18 but not converted to vapor in evaporator 14 accumulates in the bottom of vessel 10 and is designated therein by reference number 71, this water being discharged through conduit 27. Absorbent solution which is diluted in absorber 16 by absorbing water vapor accumulates in the bottom of vessel 10 on the opposite side of barrier 12 and is designated by reference number 72. The diluted absorbent liquid flows through conduits 28 and 32 to nozzles 34 of desorber 42 and is discharged therefrom in the form of fine droplets. The interior of vessel 36 is maintained at a pressure lower than that in vessel 10, and in desorber 42 water absorbed in the absorbent liquid in absorber 16 is evaporated from the absorbent liquid and flows into condenser 44 as indicated by the arrow above barrier 40. Coolant flowing through heat exchanger 56 condenses the water vapor released from the absorbent liquid, and the condensate, which is designated by reference number 74, passes from vessel 36 through conduit 76. The lithium bromide/water solution 78 which has been concentrated in desorber 42 is pumped by pump 60 through recuperator 30, where it is (1) heated by the diluted absorbent solution flowing through the heat exchanger and (2) then recycled to nozzles 66.

Reference numbers provided with superposed dots in FIG. 1 correspond with those included in the equilibrium diagram for the abovedescribed states of the lithium bromide/water absorbent liquid and water absorbate in the conventional heat pump system. The highest temperature of the absorbent liquid in its working cycle is at the absorber outlet (state 4), where the diluted lithium bromide/water solution is in vapor pressure equilibrium with evaporator 14. At the inlet to absorber 16 the absorbent liquid is at a lower temperature reached after its passage through the recuperator heat exchanger 30 (state 7). The maximum temperature that can be reached by water flowing through heat exchanger 24 is therefore limited to be lower than that of the absorbent solution as state 4. From one standpoint, it is thus desirable to raise the concentration of the diluted absorbent liquid as much as possible so as to raise the temperature of the liquid at state 4. However, it is undesirable to have the high and low concentrations of the absorbent solution close to each other, as this results in excessive circulation losses.

Figure 4:
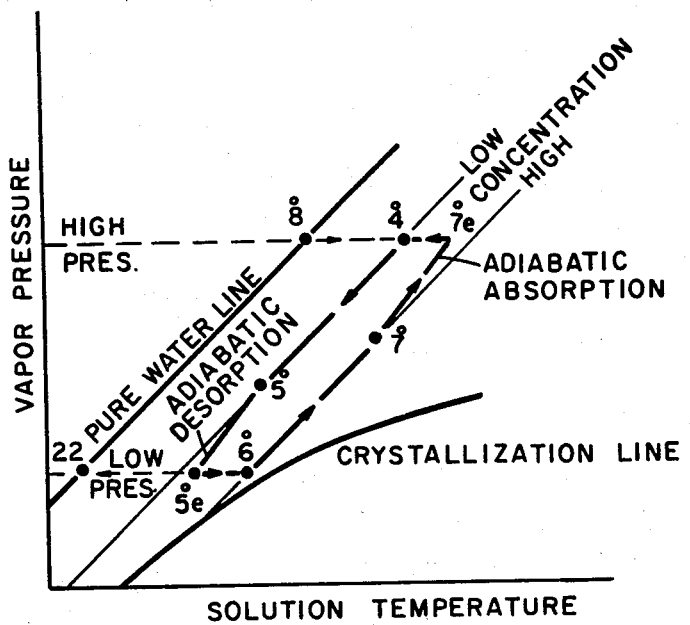
FIG. 4 is an equilibrium diagram for the above-mentioned lithium bromide/water working fluid used in the apparatus illustrated in FIG. 3.

The improvement in an absorption heat pump system provided by this invention is based on the fact that the absorbent liquid at the absorber inlet (state 7) is subcooled (which is not necessarily so in the reverse, more common absorption cycle for cooling), and is effected by a modification in absorber 16 which provides for an adiabatic absorption of vapor in the absorbent liquid prior to heat transfer from the liquid at heat exchanger 24. More particularly, the improvement in efficiency of an absorption heat pump cycle is accomplished by distributing the concentrated absorbent liquid on the large surface area of a gas-liquid contactor 68 (in FIG. 3) positioned between liquid distributor means 66 and heat exchanger 24. The modification of the heat pump cycle that is thereby attained is shown in FIG. 4. Absorbent liquid entering absorber 16 at state 7 is allowed to absorb vapor adiabatically and reaches an equilibrium state 7e before transferring heat to the liquid which enters heat exchanger 24 from conduit 22. Due to the high enthalpy of the absorbed vapor at state 8, only a relatively small amount of vapor will be absorbed in the absorbent liquid before equilibrium is reached, and hence the change in concentration of the absorbent liquid relative to its concentration at state 7 will also be small.

The following advantages are obtained by the arrangement of the invention. The highest temperature in the improved cycle is at point 7e, which is higher than the highest temperature attained in the conventional cycle at state 4 and makes possible to higher temperature boost in the liquid which is supplied to heat exchanger 24 through conduit 22. The high temperature of the cycle is rendered independent of the dilute absorbent liquid concentration, which makes it possible to lower the low concentration of the absorbent liquid with respect to its high concentration and to thus reduce the circulation rate of the absorbent liquid. This in turn reduces the pumping power requirement and the losses with the imperfect recuperator and finite heat of dilution. In addition, flows of absorbent liquid and temperature-boosted liquid in absorber 16 can be arranged in counterflow as illustrated in FIG. 3, which produces better heat transfer in heat exchanger 24 at a smaller approach temperature.

Improvement of a conventional absorption heat pump system is also obtained by providing for adiabatic removal of the absorbed component in an absorbent liquid from said liquid in desorber 42 before the heat transferring process step. Absorbent liquid entering desorber 42 is always superheated. As shown in FIG. 4, by adiabatically evaporating from the absorbent liquid the component (water in the example presented herein) which is absorbed into the liquid in absorber 16, the absorbent liquid will reach state 5e, after which it can continue to release vapor along equilibrium line 5e→6 while receiving heat energy. It is therefore possible to arrange the flow of heating liquid through heat exchanger 50 and the flow of absorbent liquid in counterflow in desorber 42, which provides better utilization of the heating liquid for desorption. For given temperatures of the heating medium for the desorber and the cooling medium for condenser 44, temperature at state 6 can then be higher, thereby allowing a higher concentration for the absorbent liquid leaving the desorber through conduit 58.

The improvement associated with adiabatic absorption and desorption may be applied to multistage absorption heat pumps. In the conventional and improved multistage systems respectively illustrated in FIGS. 5 and 6, water heated in heat exchanger 24 of the first stage absorber 16 is directed in part to distributor nozzles 18a of the second stage evaporator 14a, and the remainder of this water is further heated in heat exchanger 24a of the second stage absorber 16a. In the absorption heat pump system illustrated in FIG. 6, the advantages of the invention are achieved by (1) the placement of gas-liquid contactors 68,68a between heat exchangers 24,24a and distributor nozzles 66,66a, respectively, in absorbers 16,16a and (2) the placement of gas-liquid contactor 70 between heat exchanger 50 and distributor nozzles 34 in desorber 42.

To demonstrate the effectiveness of the above-described invention, a computer program was developed which performs a full simulation of a two-stage heat pump. The program provides a comparison of the improved cycle illustrated in FIG. 6 with the conventional cycle illustrated in FIG. 5 and evaluates the magnitude of the improvement in coefficient of performance and liquid temperature boost. Both configurations were compared on the basis of the same operating conditions, as follows: (1) low-grade heat supplied to the heat pump at a constant temperature of 60° C. (140° F.); (2) heat rejection (condensing) temperature maintained constant by cooling water at 20° C. (68° F.); (3) evaporation temperatures in the first and second stages selected so as to flash-evaporate 1% of the mass of the entering stream; (4) all heat exchangers in the systems assumed to be designed with the same closest approach temperature, i.e., the smallest temperature difference between the cold and hot streams.

The above conditions fix the operating state of an absorption heat pump system completely, leaving only one degree of freedom-selection of the low absorbent liquid concentration. Different selections of that concentration, within a limited range, provide for different temperature boosts at different coefficients of performance.

Figure 7:
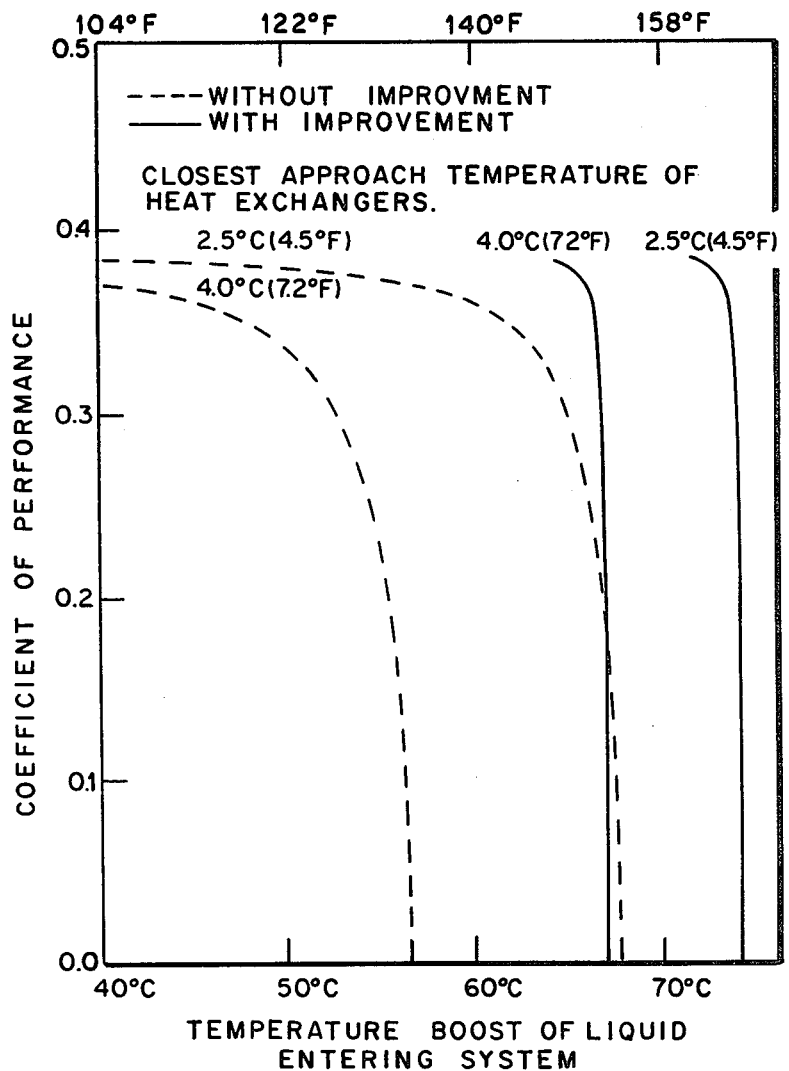
FIG. 7 is a graph showing computer-generated performance curves for two-stage heat pumps with and without the invention.

FIG. 7 shows in graphical form the results of the computer simulation performed for the conventional and improved two-stage heat pump cycles operating under the above-stated conditions. Overall coefficiencies of performance are shown as a function of temperature boost of a liquid for the conventional and improved systems, two sets of curves being presented for each heat pump configuration, one for a closest approach temperature of 2.5° C. (4.5° F.) and the other for a closest approach temperature of 4.0° C. (7.2° F.). Solid lines indicate the improved cycle and broken lines the conventional cycle.

The curves in FIG. 7 clearly demonstrate the advantage of the improved cycle in providing a higher temperature boost at a higher coefficient of performance than the conventional cycle. In both heat pump systems, a better coefficient of performance can be obtained, at the cost of a lower temperature boost, by reducing the low absorbent liquid concentration. The range for this variation in the coefficient of performance is smaller in the improved cycle than in the conventional cycle, indicating that the temperature boost and coefficient of performance are fairly insensitive to a low absorbent liquid concentration in the improved cycle. A typical operating point with the improved cycle, selected from the graph at the closest approach temperature of 2.5° C., would yield a temperature boost of 73° C. at a coefficient of performance of 38%. Such a temperature boost is not possible with the conventional absorption heat pump cycle, which, at the same coefficient of performance, would provide a temperature boost of only 45° C.

Figure 8:
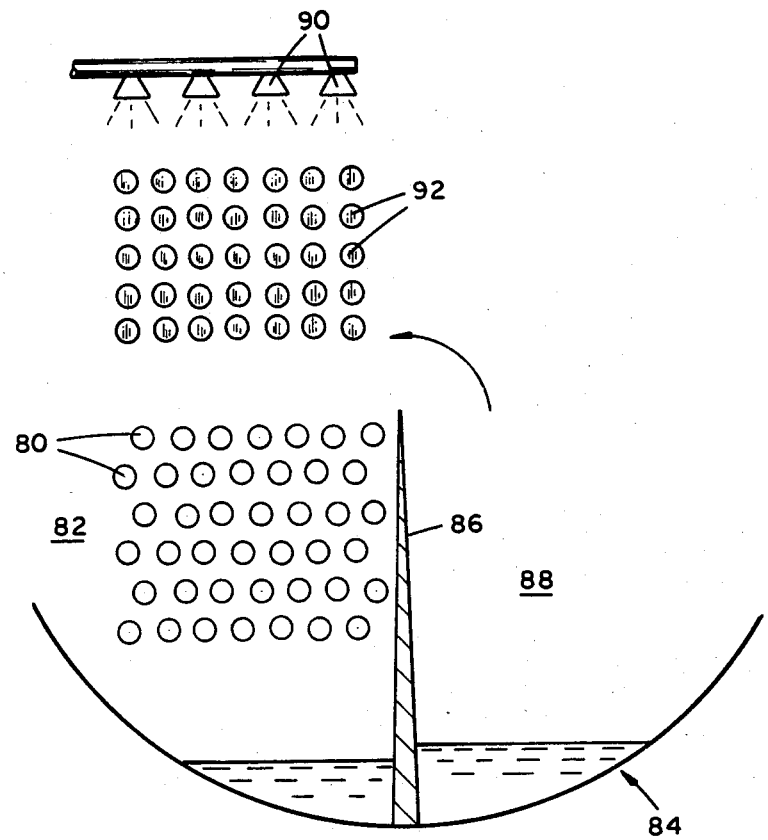
FIG. 8 is a schematic representation of a preferred gas-liquid contactor for conducting the adiabatic process steps employed in an absorption heat pump cycle in accordance with the invention.

The actual design of a system having the described cycle improvements may have different forms, the main principle of the invention being that the absorbent solution at the inlet of an absorber or desorber must be given enough contact time and contact area with the vapor to achieve equilibrium adiabatically before it contacts the heat transfer surface in contact with the temperature-boosted stream (in the absorber) or the heat-supplying stream (in the desorber), respectively. The gas-liquid contactor may consist of inclined trays, expanded mesh, column packing and as Berl saddles or Raschig rings or other types of gas-liquid contactors commonly used in chemical systems. FIG. 8 illustrates another practical arrangement for achieving adiabatic equilibrium between the absorbent liquid and the vapor absorbed thereby or released therefrom before heat transfer to or from another liquid occurs. In the drawing reference number 80 designates a plurality of spaced, parallel, horizontally-extending heat exchanger tubes, the tubes being illustrated in cross section in an absorber 82 of a vessel 84 having a barrier 86 which separates the absorber from an evaporator 88. Positioned above tubes 80 are a plurality of spray nozzles 90, and positioned between these nozzles and tubes 80 are a plurality of tubes 92 which also extend horizontally in spaced, parallel relation to one another. Liquid flows through tubes 80 and is heated by the absorption of vapor into the absorbent liquid discharged from nozzles 88. However, no liquid flows through tubes 90, which are included in the apparatus only to provide contact area between the absorbent liquid and the vapor absorbed thereby, under adiabatic conditions. Other modifications of the apparatus disclosed herein can obviously be made without departing from the principles of the invention.

What is claimed is:

1. In an absorption heat pump system having a chamber wherein a vapor is generated, an absorber receiving said vapor from said chamber, a first heat exchanger in said absorber for boosting the temperature of a first liquid passed through the heat exchanger, a first liquid distributor associated with said first heat exchanger for distributing a second liquid thereon, said vapor being absorbed into said second liquid as an additional component thereof and thereby generating heat which boosts the temperature of said first liquid, a desorber, a second heat exchanger in said desorber, a second liquid distributor associated with said second heat exchanger for distributing liquid thereon, first conduit means for conducting said second liquid containing said additional component from said absorber to said second liquid distributor for distribution on said second heat exchanger, said additional component being released from said second liquid after being discharged from said second liquid distributor, and second conduit means for conducting said second liquid from said desorber back to said first liquid distributor, the improvement comprising:

a gas-liquid contactor positioned between said first heat exchanger and said first liquid distributor for providing adiabatic absorption of said vapor into said liquid prior to transfer of heat to said first liquid.

2. The absorption heat pump system of claim 1 further including a second gas-liquid contactor positioned between said second heat exchanger and said second liquid distributor for providing adiabatic desorption of said additional component from said second liquid.

3. The absorption heat pump system of claim 2 wherein said second liquid comprises water and lithium bromide.

4. The absorption heat pump system of claim 3 wherein said gas-liquid contactor comprises a packing material.

5. The absorption heat pump system of claim 4 wherein:

each of said first and second heat exchangers comprises a first plurality of tubes which extend horizontally and are spaced apart from one another; and each of said first and second liquid distributor comprises a second plurality of tubes which extend horizontally and are spaced apart from one another above said first plurality of tubes.

* * * * *